Sept. 26, 1967 R. A. RICE 3,343,858
RESILIENT LINK CONSTRUCTION
Filed Oct. 21, 1966
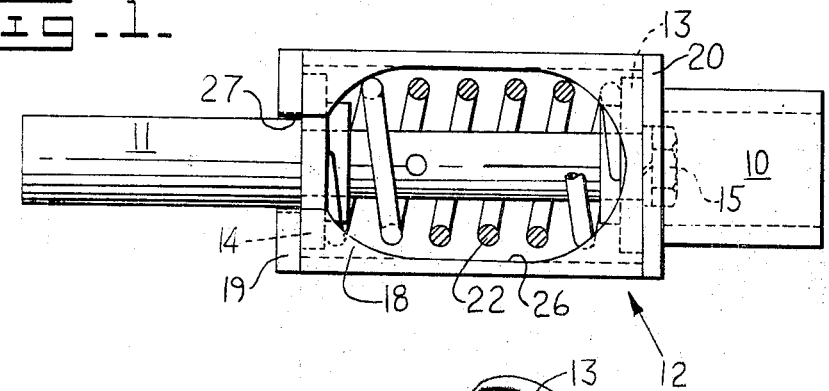
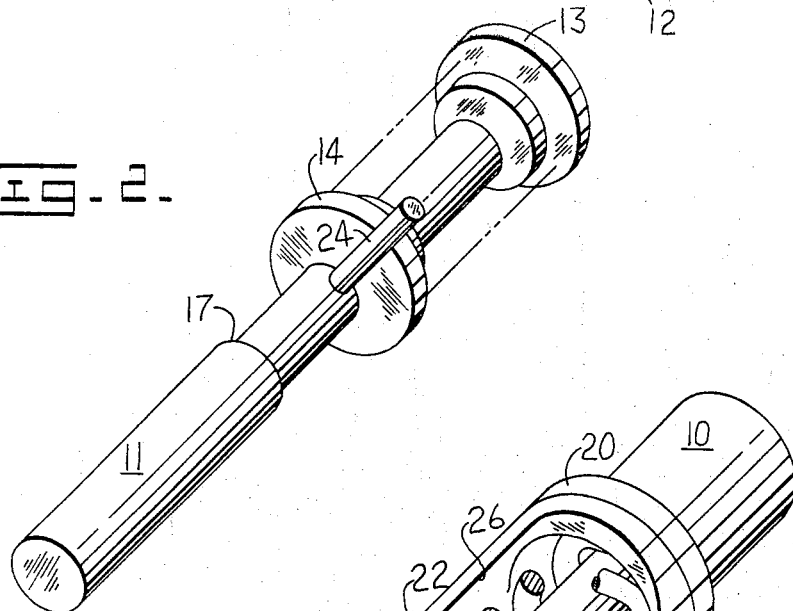
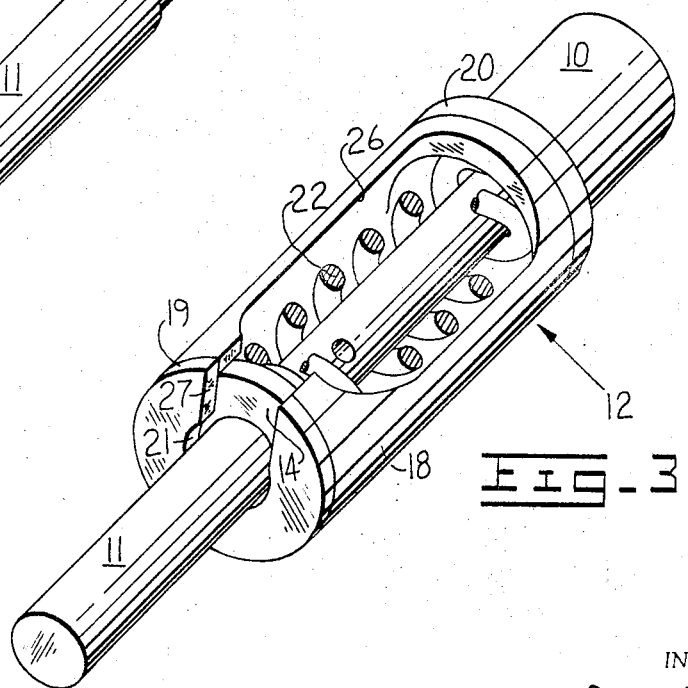
INVENTOR.
Roger A. Rice
BY
ATTORNEYS United States Patent Office 3,343,858
Patented Sept. 26, 1967

3,343,858
RESILIENT LINK CONSTRUCTION
Roger A. Rice, Joliet, Ill., assignor to Caterpillar Tractor Co., Peoria, Ill., a corporation of California
Filed Oct. 21, 1966, Ser. No. 588,425
3 Claims. (Cl. 287—119)

ABSTRACT OF THE DISCLOSURE

A link for connection of two rod parts comprising one rod part with the housing having a side opening and another rod part with a spring pressed between two slidable spring seats so constructed that the spring can be compressed and inserted into the housing through the side opening.

When a link is employed to connect two members so that movement of one imparts movement to the other, it is sometimes desirable to include resiliency in the link in case one member does not move as, for example, where it has reached the limit of its movement. Such links are known and generally include a spring arranged to be compressed to absorb movement which would otherwise be transmitted from one link to the other.

In summary, the present invention has to do with improvements in resilient links of the kind referred to and particularly to improvements in the construction which enables assembly and disassembly of link parts in a resilient link.

It is an object of this invention to provide an improved resilient link which is very simple and durable in construction and capable of being very easily assembled and disassembled.

Further and more specific objects and advantages of this invention are made apparent in the following specification wherein it is described in detail by reference to the accompanying drawing.

In the drawing:

FIG. 1 is a view in side elevation of a link embodying the present invention with the resilient member thereof shown in section;

FIG. 2 is a perspective view of one part of the link showing it in position for assembly into the other part; and FIG. 3 is a perspective view of the entire link after assembly.

Referring first to FIGS. 1 and 3, the link of the present invention is shown as made up of two link parts 10 and 11. The first link part 10 is tubular and is welded to the end of a cylindrical housing generally indicated at 12. The second link part 11 has a reduced end which extends into the housing and has two spring seats thereon, both of which are slidable on the reduced portion of the link part. One of the spring seats, shown at 13, is disposed adjacent the end of the link part and held against removal therefrom as by a cap screw shown at 15 in FIG. 1. The other spring seat shown at 14 abuts a shoulder 17 which is best shown in FIG. 2.

The spring housing 12 is composed of a cylindrical body member 18 and two end members 19 and 20 welded or otherwise secured thereto and each having a central opening as for example the opening shown at 21 in FIG. 3 through which the link part 11 extends. A spring 22 is disposed between the spring seats 13 and 14 and it is preloaded to a desired extent so that under normal operating conditions movement of either link part 10 or 11 imparts similar movement to the other part. If some member to which either of the parts is connected is not movable by a predetermined force, the spring will collapse thus absorbing the movement of one part so that it does not have to be transmitted to the other parts. For example assuming the spring part 11 of FIG. 1 to be moved toward the left, if part 10 is relatively immovable spring seat 13 will be moved toward the left and the spring will be compressed between the seats 13 and 14. If the movement of part 11 is toward the right, the spring seat 14 will move toward the right and again the spring 22 will be compressed between the spring seats. Since the link part 10 is firmly attached to the spring housing 12, its movement in either direction when the part 11 is relatively immovable will similarly effect compression of the springs.

In accordance with the present invention, the construction of the resilient link shown is extremely simple and it is easily assembled since the spring and spring seats may be assembled onto link part 11 in the manner shown in FIG. 2 where the spring is omitted for clarity. After assembly, the spring seat 14 is urged toward the spring seat 13 compressing the spring and enabling a pin 24 to be inserted to hold the spring in its compressed position. With the spring so held, the spring assembly may be inserted through an opening 26 in the cylindrical body 18 of the spring housing and a contiguous and adjoining slot 27 in the end plate at 19. The pin 24 may then be removed preferably after slight additional compression of the spring to facilitate its removal and the parts then assume the positions illustrated in FIGS. 1 and 3. It is of course to be understood that the link parts 10 and 11 will in use be connected by any suitable means (not shown) with levers or other linkage for transmitting movement from one point to another.

I claim:

1. A resilient link comprising a link part having a generally cylindrical housing secured to one end, a second link part with a portion adapted to be received co-axially within said housing, a spring seat slidable on the end of said portion, a second spring seat slidable on said portion, a spring compressible between said seats, and said housing having an opening through its side wall contiguous with an opening in its end wall adapted to admit both spring seats and the spring, the side wall opening having an enlarged intermediate portion at least as wide as the spring seats terminating short of the ends of the interior of said housing whereby the seats are retained adjacent the ends against lateral displacement.

2. The combination of claim 1 with means for retaining the spring in a compressed position during its assembly into the housing.

3. The combination of claim 2 with a shoulder on the second link part to limit the movement of the slidable spring seat away from the other spring seat.

References Cited

UNITED STATES PATENTS

| 919,056 | 4/1909 | Mitchell | 74—582 X |
| 1,091,105 | 3/1914 | Young | 74—582 X |
| 3,123,881 | 3/1964 | Westman | 24—123.1 X |
| 3,237,977 | 3/1966 | Batchelder | 287—119 |

FOREIGN PATENTS

| 93,559 | 7/1923 | Austria. |
| 641,902 | 5/1928 | France. |

CARL W. TOMLIN, *Primary Examiner.*

A. V. KUNDRAT, *Assistant Examiner.*